(12) United States Patent
Berne et al.

(10) Patent No.: US 6,698,914 B2
(45) Date of Patent: Mar. 2, 2004

(54) OPTICAL UNIT FOR A VEHICLE, COMPRISING IMPROVED HEADLAMP FASTENING MEANS

(75) Inventors: Sébastien Berne, Montbeliard (FR); Caroline Riviere, Valentigney (FR)

(73) Assignee: Faurecia Industries, Boulogne Billancourt (FR)

( * ) Notice: Subject to any disclaimer, the term of this patent is extended or adjusted under 35 U.S.C. 154(b) by 31 days.

(21) Appl. No.: 10/067,393

(22) Filed: Feb. 7, 2002

(65) Prior Publication Data

US 2002/0131272 A1 Sep. 19, 2002

(30) Foreign Application Priority Data

Feb. 8, 2001 (FR) .............................. 01 01728

(51) Int. Cl.⁷ ................................ B60Q 1/04
(52) U.S. Cl. .................. 362/549; 362/523; 362/287
(58) Field of Search .................. 362/287, 419, 362/507, 543, 544, 548, 549, 523

(56) References Cited

U.S. PATENT DOCUMENTS 4,639,840 A * 1/1987 McMahan et al. .......... 362/549
5,420,762 A * 5/1995 Lewis ......................... 362/549
5,424,923 A * 6/1995 Young et al. ................ 362/549
5,428,511 A   6/1995 Luallin et al.
5,510,968 A * 4/1996 Pokriefka et al. ........... 362/549
5,702,174 A   12/1997 Dobler
6,273,588 B1 * 8/2001 Arakelian .................... 362/549

FOREIGN PATENT DOCUMENTS

| DE | 196 32 688 A1 | 2/1997 |
| EP | 0 649 773 A1 | 4/1995 |
| WO | WO 00/07844 | 2/2000 |

* cited by examiner

*Primary Examiner*—Sandra O'Shea
*Assistant Examiner*—Peggy A. Neils
(74) *Attorney, Agent, or Firm*—Young & Thompson

(57) ABSTRACT

The optical unit for an automotive vehicle comprises a housing (5) having a main opening (13) intended to be facing the vehicle exterior, and at least one headlamp element (17) fixed inside said housing. The optical unit comprises an intermediate fastening member (21) on which said headlamp element (17) is fixed, said intermediate fastening member (21) being itself fixed detachably inside the housing (5) by releasable fastening means (22), such as to be displaceable toward the main opening (13) of the housing (5) when said fastening means (22) are released.

14 Claims, 7 Drawing Sheets

OPTICAL UNIT FOR A VEHICLE, COMPRISING IMPROVED HEADLAMP FASTENING MEANS

The invention lies within the field of equipment for automotive vehicles.

It relates to an optical unit for an automotive vehicle, comprising a housing having a main opening intended to be facing the vehicle exterior, and at least one headlamp element fixed inside said housing.

Optical units of this type are already known in the prior art, especially mounted on the front face of the vehicle, the lamps of which are accessible from the engine compartment. Thus, in order to replace a lamp of the optical unit, the user has to operate hanging over the optical unit by slipping his hands into an extremely cramped space in the engine compartment. The user therefore has little visibility and room to handle the lamp and effect the replacement operation.

It has already been proposed to remedy this drawback by proposing an optical unit for an automotive vehicle, the removal of the component parts of the headlamp of which, in particular of the lamps, lamp bases and/or deflectors, is facilitated by increased accessibility.

An optical unit is in fact known comprising an intermediate fastening member on which said headlamp element is fixed, said intermediate fastening member being itself fixed detachably inside the housing, by releasable fastening means, such as to be displaceable toward the main opening of the housing when said fastening means are released.

Such an optical unit does not give complete satisfaction, since maintenance of the lighting elements cannot be carried out from the front without losing the settings of the optics.

A main object of the invention is to remedy this drawback.

To this end, the releasable fastening means comprise means for positionally adjusting the intermediate fastening member relative to the housing and the adjusting means comprise a support which is positionally adjustable relative to the housing and is suitable for receiving the intermediate fastening member according to a detachable fastening connection.

According to other characteristics of the invention:

- the intermediate fastening member is a fixing plate in which at least one recess is made, suitable for receiving in a complementary manner said at least one headlamp element;
- the intermediate fastening member has at least one grip handle projecting toward the main opening;
- said releasable fastening means comprise releasable locking means ensuring the detachable fastening connection of the intermediate fastening member on the adjustable support (22);
- the releasable locking means comprise at least one locking finger mounted pivotably on the support and comprising a locking pin suitable for cooperating with a shoulder formed on the intermediate fastening member, and a form of rotary drive;
- the releasable locking means comprise at least one pair of complementary latching elements formed respectively on the intermediate fastening member and on the support, suitable for retaining the intermediate fastening member and the support in a mutual pre-locked ready position;
- the adjustable support has a guide for the intermediate fastening member between a locking position and a pre-mounting position on said support;
- the adjustable support has a body suitable for cooperating by complementarity of form with the intermediate fastening member, when these are in their locking position, and the guide extends substantially in the direction of the main opening from said body;
- the guide has a free end edge close to which a member is formed for retaining the intermediate fastening member in its pre-mounting position, said retaining member being suitable for cooperating with a complementary member formed on the intermediate fastening member;
- the retaining member and the complementary member define a pivot connection allowing pivoting of the intermediate fastening member relative to the support, when the intermediate fastening member reaches a position close to the free end edge of the guide;
- the optical unit comprises a glass fixed detachably on the housing such as to close off at least partially the main opening; and
- the housing is realized in one piece with a bodywork element or structural element of the vehicle.

The invention also relates to a front face of an automotive vehicle comprising an optical unit of the type previously described.

Finally, the invention relates to an automotive vehicle equipped with such an optical unit.

The invention will be better understood from a reading of the following description, given purely by way of example and made with reference to the appended drawings, in which:

FIG. 1 shows an optical unit 1, mounted and fixed on a front face section 2 of an automotive vehicle.

Figure 1:
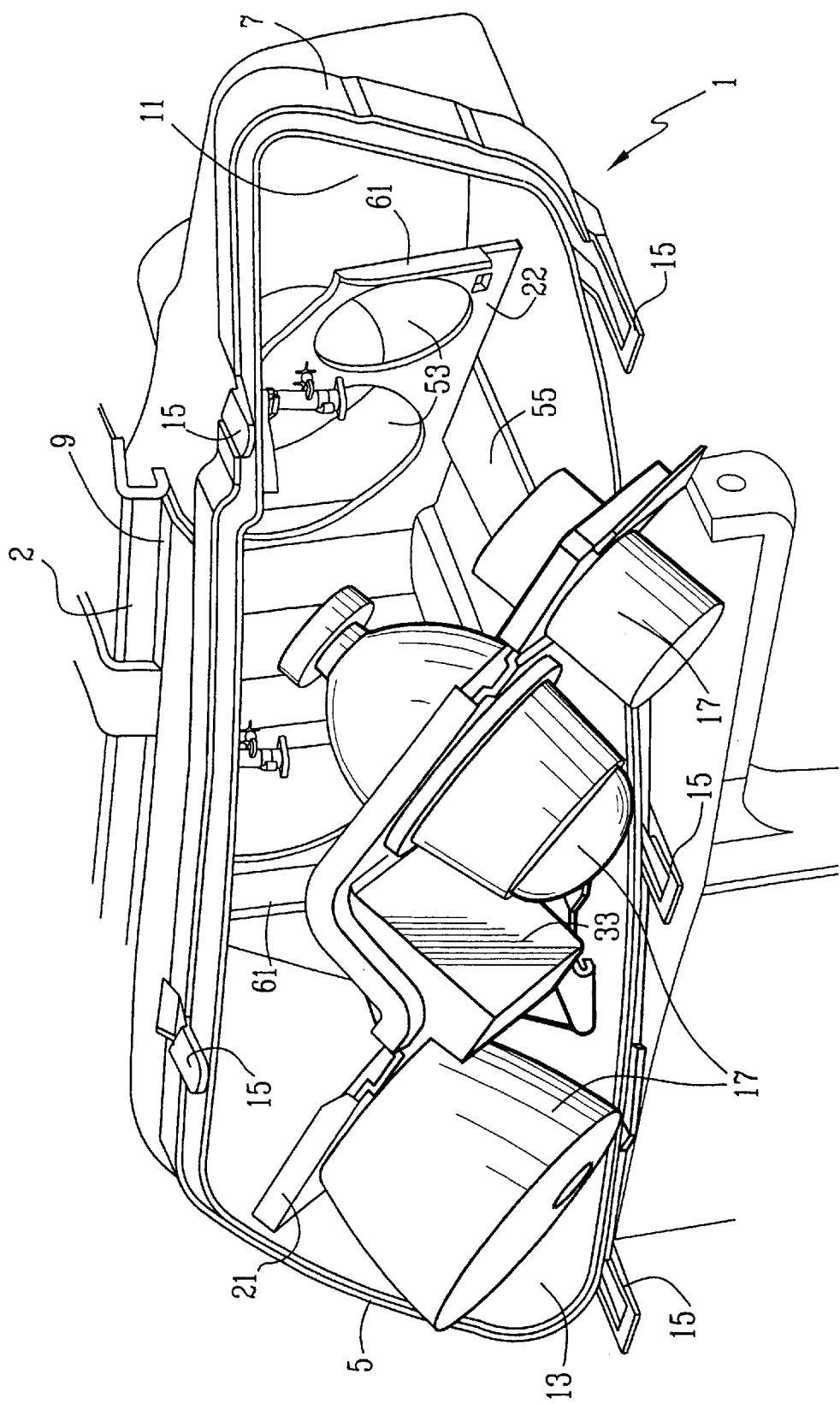
FIG. 1 is a front view of an optical unit according to the invention and of a vehicle front face section, with which the optical unit is integral.

In order to simplify the following description, the optical unit will be orientated relative to its working arrangement on the vehicle and the terms "front", "rear", "lower", "upper", etc. will be understood according to the normal orientation of the vehicle.

Traditionally, a front optical unit 1 of this type comprises a housing 5, integrated by complementarity of form in the front face 2 of the vehicle and comprising on its periphery means of fastening onto said front face 2.

In the represented embodiment the housing 5 is mounted directly on the front face 2, but the invention is also conceivable in the case of a housing realized in one piece with the front face 2 or with other bodywork elements or structural elements of the vehicle. The invention is additionally conceivable for an optical unit disposed elsewhere on the vehicle, for example at the rear.

The housing 5 has a peripheral skirt 7, which cooperates with complementary edges 9 of the front face 2, a back 11 situated on the engine compartment side and integrated in the front face 2, and a frontal opening 13 constituting the main opening of the housing 5 facing the vehicle exterior, opposite to the back 11 of the housing.

The housing 5 has elastic lugs 15 projecting frontward from the peripheral skirt 7, these elastic lugs 15 being designed to cooperate with complementary pins of a glass (not represented) of the optical unit. The glass, which has not been represented for reasons of clarity, is thus fixed detachably on the housing 5 so that it closes off the main opening 13, sealing means being interposed between said glass and the peripheral skirt 7.

The glass can thus be easily withdrawn from the housing 5, thereby providing access facility to the interior of the housing 5 from the vehicle exterior, without passing through the engine compartment.

The optical unit 1 comprises, on the other hand, headlamp elements 17, here represented as being three in number, which are constituted, for example, by a lamp, a lamp holder and/or a reflector, and are fixed inside the housing 5. Each projector element 17 is either a lamp, or an element associated with a lamp, each of these lamps being fed with electricity from the back 11 of the housing 5.

The fixing of the headlamp elements 17 relative to the housing 5 is realized by means of two intermediate members 21, 22, the first 21 being an intermediate fastening member, in the form of a fixing plate, and the second 22 being a position-adjusting member in the form of an adjustable support. These intermediate members 21, 22 of the optical unit 1 will be described in greater detail with reference to FIGS. 2 to 4.

The headlamp elements 17 are fixed on the fixing plate 21 such as to be removable from said fixing plate 21, the fastening means used being of a known type (for example by screwing, bayonet fitting, etc.).

The adjustable support 22 is suitable for receiving the fixing plate 21 according to a detachable fastening connection, which will subsequently be described in greater detail and which allows a user to displace the fixing plate 21 toward the main opening 13 of the housing 5 when the fastening means of the plate 21 on the adjustable support 22 are released. The adjustable support 22, disposed in the housing 5 toward the back 11 of the latter, is joined to the housing 5 by mechanical connections granting a pivoting of the adjustable support 22 in the housing 5. Thus, the support 22 can be orientated jointly with the headlamp elements 17 when these are fixed on the fixing plate 21 and the fixing plate 21 is fixed on the adjustable support 22.

The mechanical connections of the adjustable support 22 on the housing 5 have not been represented, but comprise, in particular, swivel joints allowing the adjustable support 22 to be pivoted along different axes.

Figure 2:
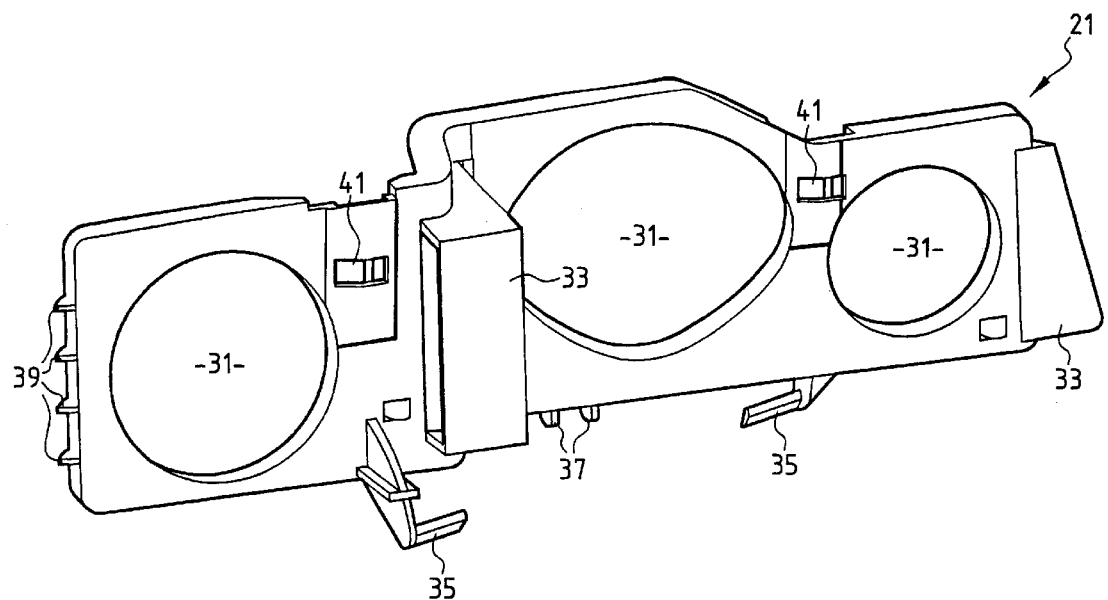
FIG. 2 is a front view of the fixing plate receiving the headlamp elements of the optical unit represented in FIG. 1.

The fixing plate 21 will now be described in greater detail with reference to FIG. 2.

The fixing plate 21 has three recesses 31, here formed by through holes, each being complementary to a respective headlamp element 17. The fastening elements of the headlamp elements 17 in the recesses 31 are detachable fastening means, such as screw-type or bayonet-type fastening means, so that the headlamp elements 17 are easily replaceable. The plate 21 comprises, on the other hand, grip handles 33 projecting over the face of the plate 21 facing the main opening 13 of the housing 5, these handles 33 being intended to facilitate the withdrawal of the plate 21 and its installation. Bars 35, substantially mutually aligned, are formed projecting downward from the plate 21. The bars 35 define guide and retaining members for the plate 21 on the support 22. Other guide members 37, vertically staggered relative to the bars 35, are formed on a lower peripheral edge of the plate 21. Centering teeth 39, formed on a lateral peripheral edge, ensure a precise positioning of the plate 21 relative to its support 22. In the plate 21 there are also formed slots 41, intended to cooperate with a complementary locking pin mounted on the support 22. In the embodiment illustrated by the drawings, these slots 41 have been represented as being two in number.

Figure 3:
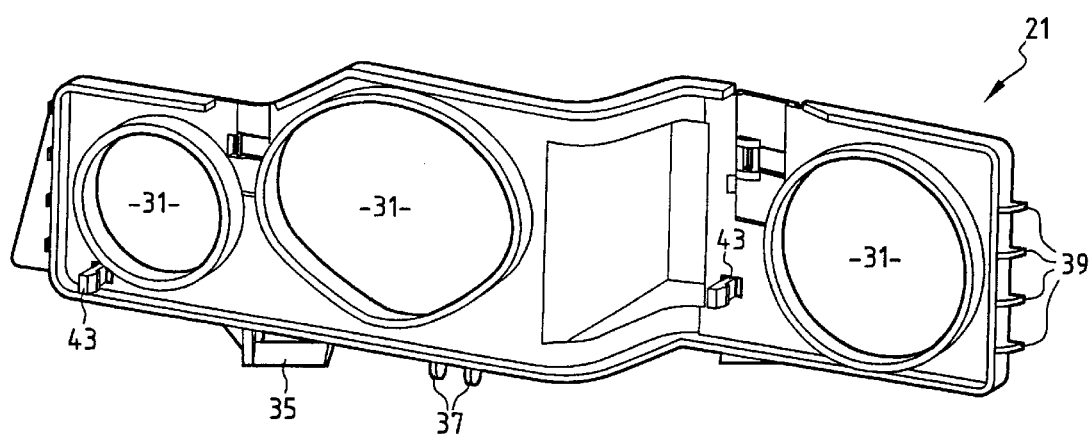
FIG. 3 is a rear view of the fixing plate of FIG. 2.
Figure 8:
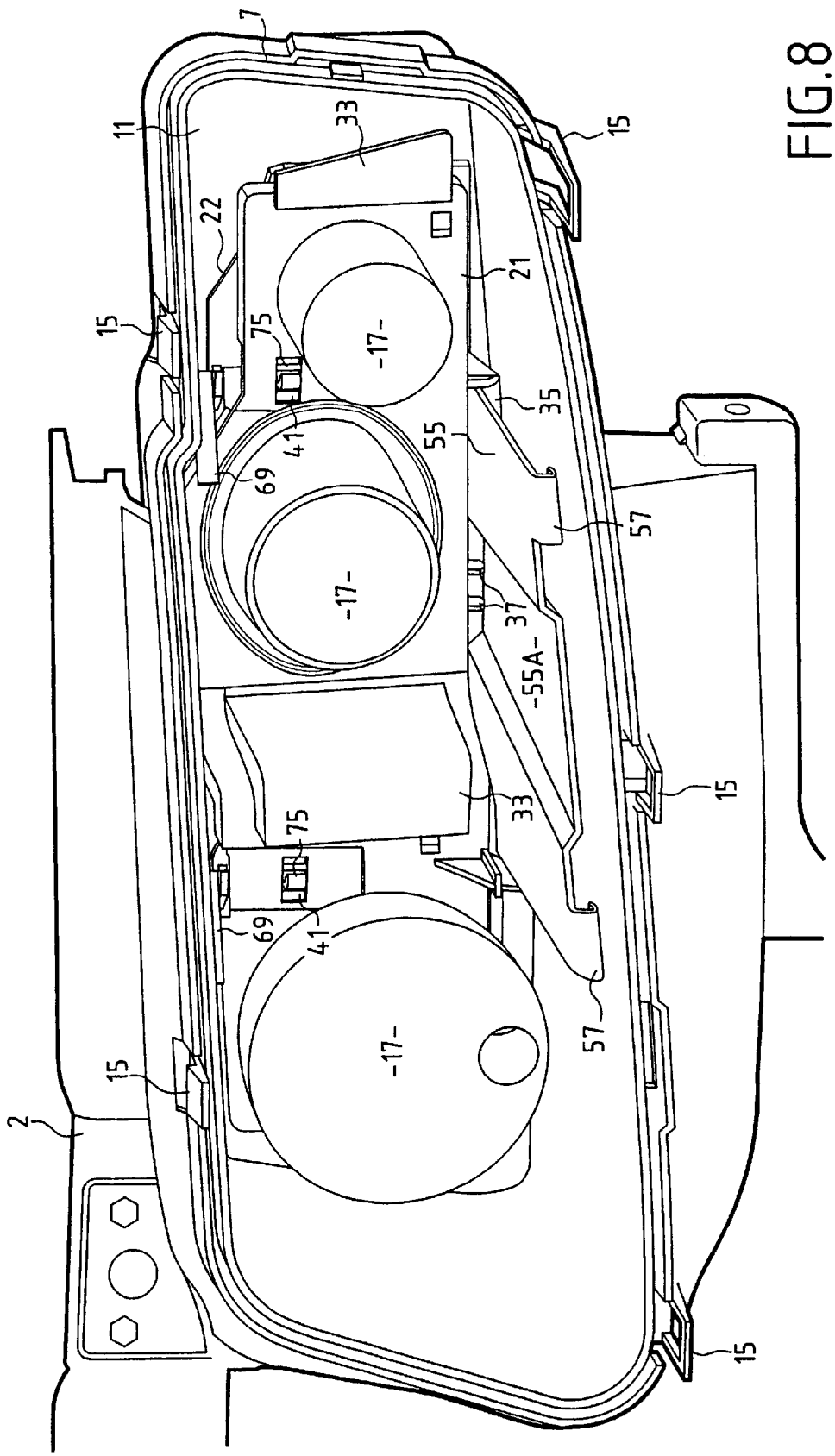
FIG. 8 is an analogous view, in the pre-locked position of the fixing plate of the adjustable support.

In FIG. 3, the same fixing plate 21 has been represented in rear view, such as to reveal two elastic lugs 43 formed projecting from the plate 21, facing the support 22, and designed to define, with complementary members of said support 22, a pre-locked ready position which will be illustrated in FIG. 8.

Figure 4:
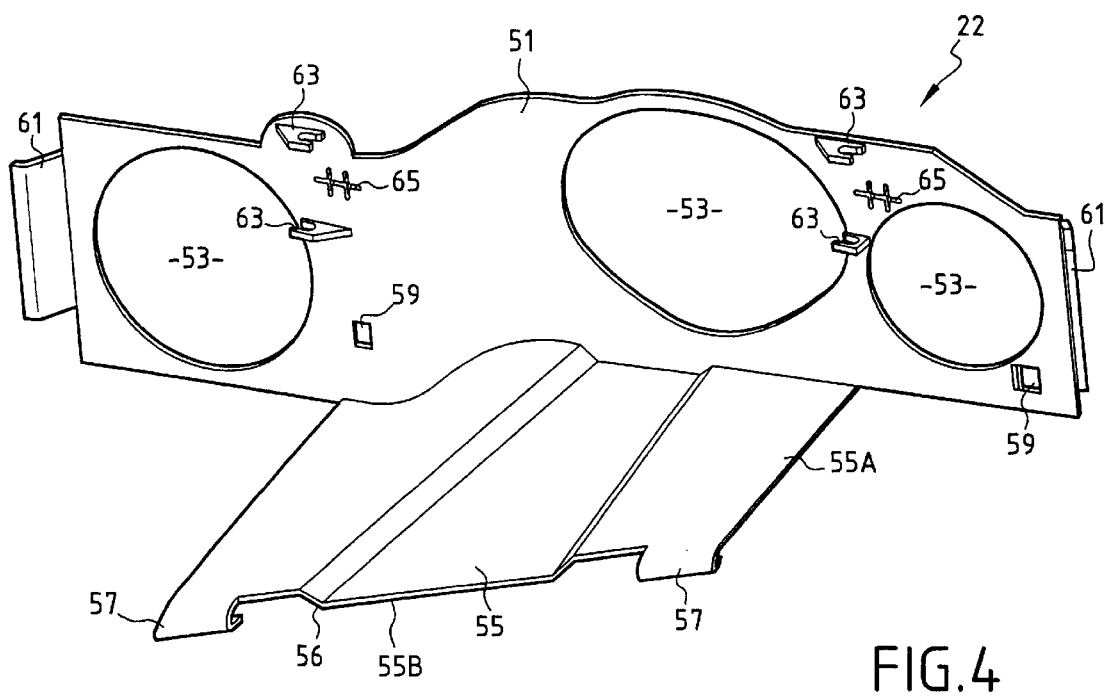
FIG. 4 is a front view of the adjustable support of the optical unit of FIG. 1.

The adjustable support 22 will now be described in greater detail with reference to FIG. 4.

This support 22 has a body 51 in the form of a plate substantially complementary in shape to the fixing plate 21, so that the fixing plate 21 can be laid flush against the body 51 when the fixing plate 21 and the support 22 are in their locked position, ensuring a stable retention of the one upon the other. The body 51 comprises three through holes 53 of corresponding shapes to the recesses 31 in the fixing plate 21. These holes 53 are disposed on the body 51 such as to be congruent with the recesses 31 in the fixing plate 21 when the latter is fitted onto the support 22. Thus, the headlamp elements 17 fixed on the fixing plate 21 can emerge through the holes 53 toward the back 11 of the housing 5 so as to be fed with electricity from the engine block through the back 11.

The support 22 has a guide 55, in the form of a screen, projecting toward the main opening 13 from a lower edge of the body 51. The guide 55 is configured such that its upper face 55A can receive in sliding motion the fixing plate 21. The guiding and retaining bars 35 of the fixing plate 21 engage on the lower surface 55B of the guide 55 such as to limit the relative displacement of the fixing plate 21 relative to the support 22 in transverse directions relative to the principal direction of slide. The upper surface 55A of the guide 55 is also intended to cooperate with the guide members 37 provided on the edge of the fixing plate. The guide 55 has a free end edge 56 on which there are formed two retaining members 57, in the form of hook fastenings created by means of a material turn, each of said hook fastenings 57 being suitable for cooperating with a respective bar 35 of the fixing plate 21 such as to form therewith a translatory stop member in the direction of slide of the fixing plate 21 relative to the support 22, as well as a hinge creating a pivot axis of the plate 21 relative to the support 22.

In the body 51 there are formed two slots 59, corresponding respectively to the elastic lugs 43. Each elastic lug 43 forms with the respective slot 59 a pair of complementary latching elements which define the pre-locked ready position of the plate 21 on the support 22.

A bearing surface 61 is formed projecting from each side edge of the body 51, converging toward the latter, in a position corresponding to the centering teeth 39 arranged on the plate 21. The points of the centering teeth 39 come to bear upon the surface 61 when the fixing plate 21 is brought near to the body 51.

Figure 5:
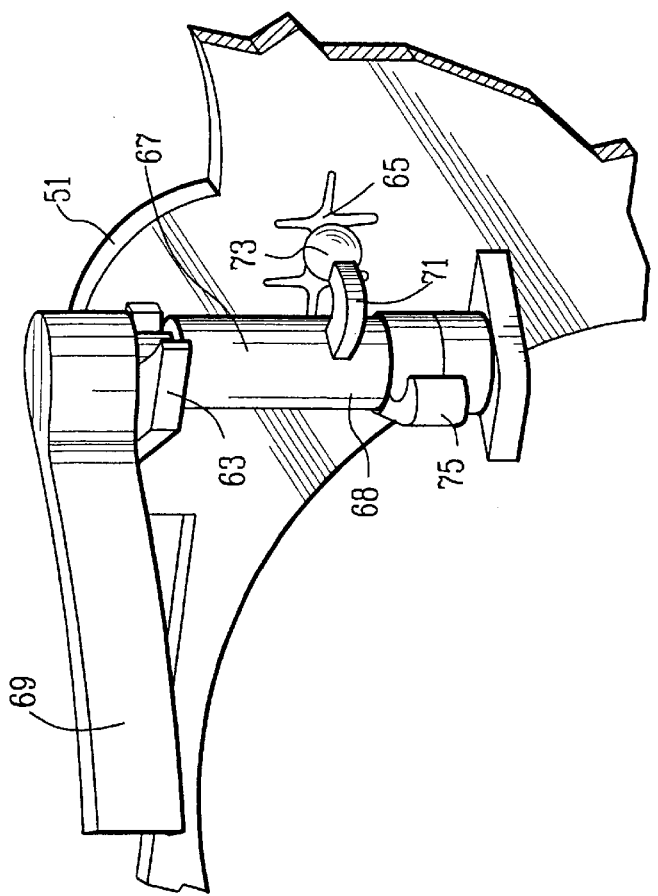
FIG. 5 is a view, on a larger scale, of a locking finger, mounted on the adjustable support represented in FIG. 4.

Projecting from the body 51, in the same direction as that of the guide 55, two pairs of hinge elements 63 are formed, the elements 63 having, two by two, vertically aligned notches, suitable for receiving, in pivotal engagement, the locking fingers such as represented in FIG. 5. Close to the axis of alignment of the hinge elements 63, a respective perforation 65 is arranged in the body 51, this perforation having elastically deformable edges.

FIG. 5 shows in enlarged, detailed view a pair of hinge elements 63, provided with a locking finger 67. The locking finger 67 is constituted by a rod 68, mounted pivotably in the notches of the hinge elements 63, and by a control bar 69 integral with the rod 68 at an accessible end of the latter, the control bar 69 being configured so as to be easily grasped and displaced by the user. The rod 68 is provided, on the other hand, in an intermediate section situated between the hinge elements 63, with a radial projection 71, the free end of which, shaped as a ball 73, is disposed opposite the perforation 65 of the body 51. Thus, when the control bar 69 is rotated about the axis created by the finger 67 and the hinge elements 63, the ball 73 passes through the perforation 65 in the one or the other direction, its edges being elastically deformed. This produces stop notches for the rotation of the locking finger 67. A pin 75 is also formed on the rod 68 of the locking finger 67, this pin 75 being suitable for cooperating with a corresponding shoulder of the respective slot 41, provided in the fixing plate 21. The pin 75 engages on the shoulder of the slot 41, or disengages therefrom, depending on the position of the locking finger 67 in the hinge elements 63.

Figure 6:
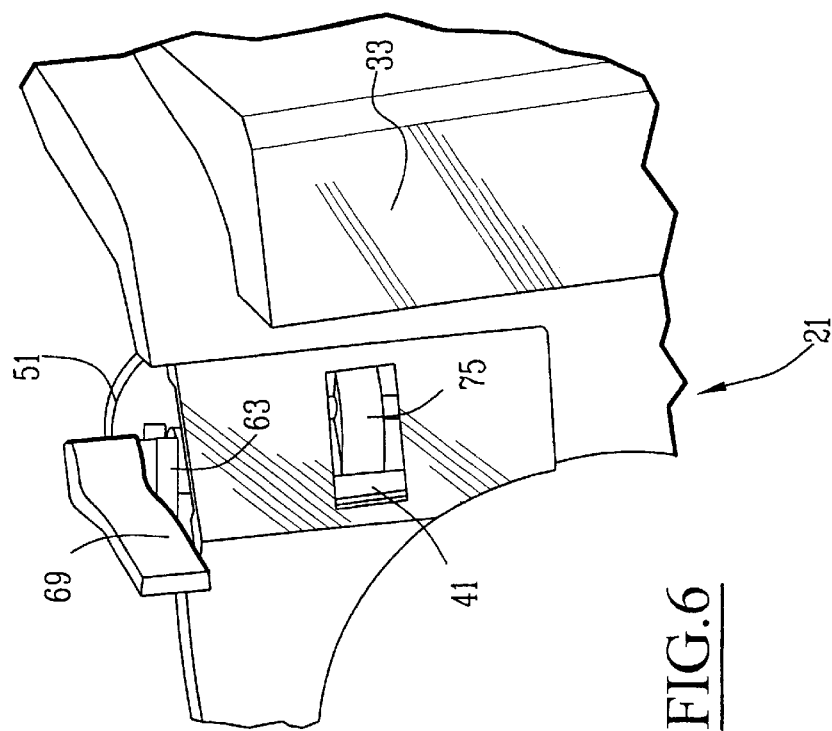
FIG. 6 is a detailed view, on a larger scale, showing the locking finger of FIG. 5 in its position locking the fixing plate on the adjustable support.

FIG. 6 illustrates the locking position of the fixing plate 21 on the body 51 of the support 22, obtained by the engagement of the pin 75 in the slot 41.

In the following figures, the three main positions of the fixing plate 21 relative to the support 22 have been illustrated.

Figure 7:
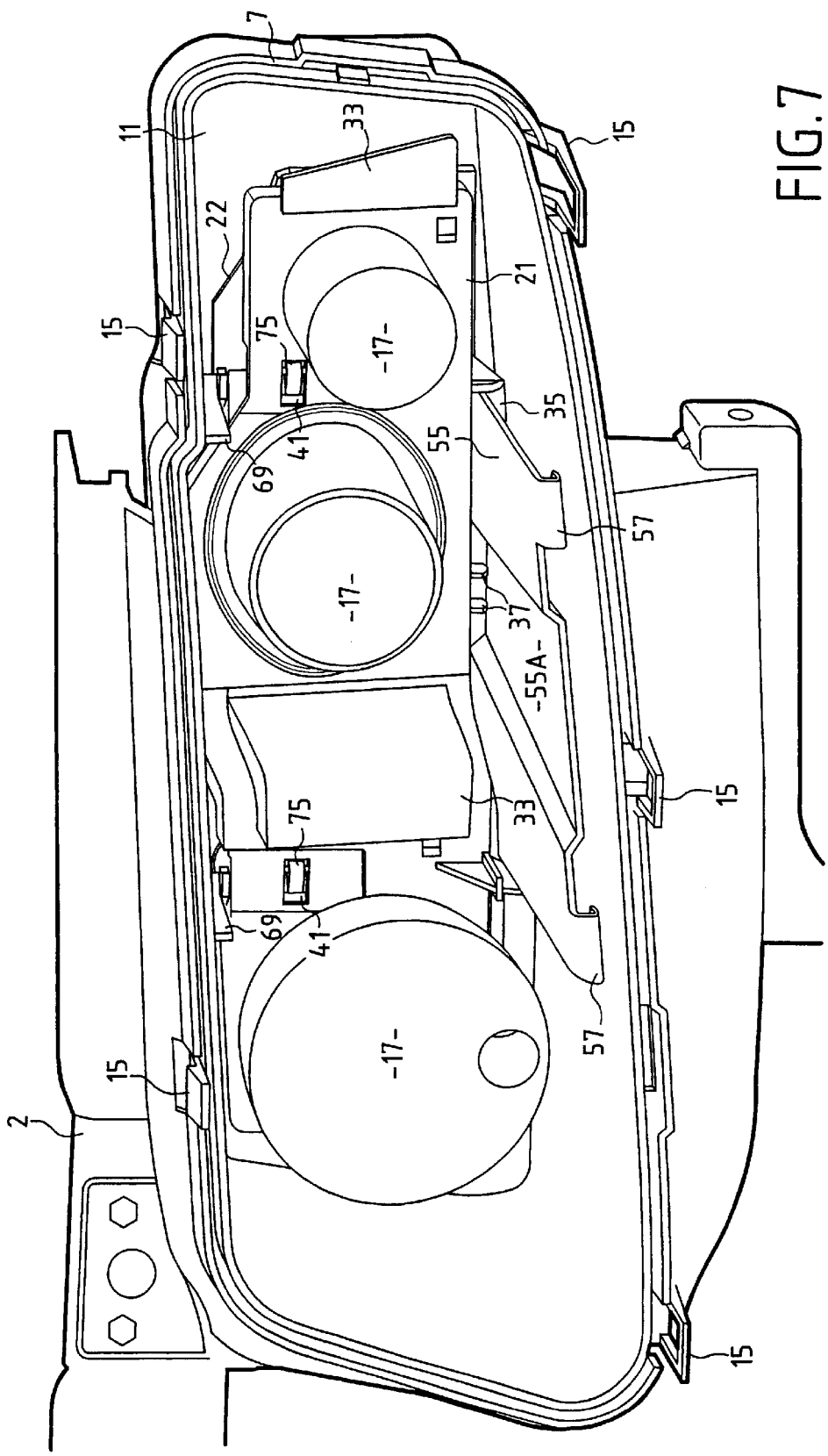
FIG. 7 is a front view of the optical unit of FIG. 1, in the locked position of the fixing plate on the adjustable support.

FIG. 7 shows the fixing plate 21 equipped with three headlamp elements 17 and fixed in fully locked position on the support 22. Here too, the glass which normally equips the optical unit and which is fixed to the housing by elastic lugs 15 has not been represented.

A user who wishes to proceed to replace a lamp or a headlamp element 17 will need to remove this glass, whereupon he finds himself in the situation represented in FIG. 7. In an initial stage, the user has to rotate-manoeuvre the control bars 69 of the locking fingers 67 such as to disengage the pins 75 from the slots 41.

The fixing plate 21 and the support 22 are then in their pre-locked position represented in FIG. 8, in which they are kept fitted together purely through the cooperation of the elastic lugs 43 and the corresponding slots 59. These latching members are not visible in this figure.

In order to proceed to remove headlamp elements 17, the operator must next apply a traction force to the handles 23 of the fixing plate 21 from the back 11 of the optical unit. The displacement of the fixing plate 21 is realized by sliding motion, along the guide 55, the guide members 37 coming to bear upon the upper surface 55A of the guide 55 and the bars 35 coming to bear upon the lower surface 55B.

The operator slides the fixing plate 21 up to the stop position of the bars 35 in the hook fastenings 57, a position from which the fixing plate 21 is liable to pivot relative to the support 22, the bars 35 and the respective hook fastenings 57 together defining a hinge connection.

Figure 9:
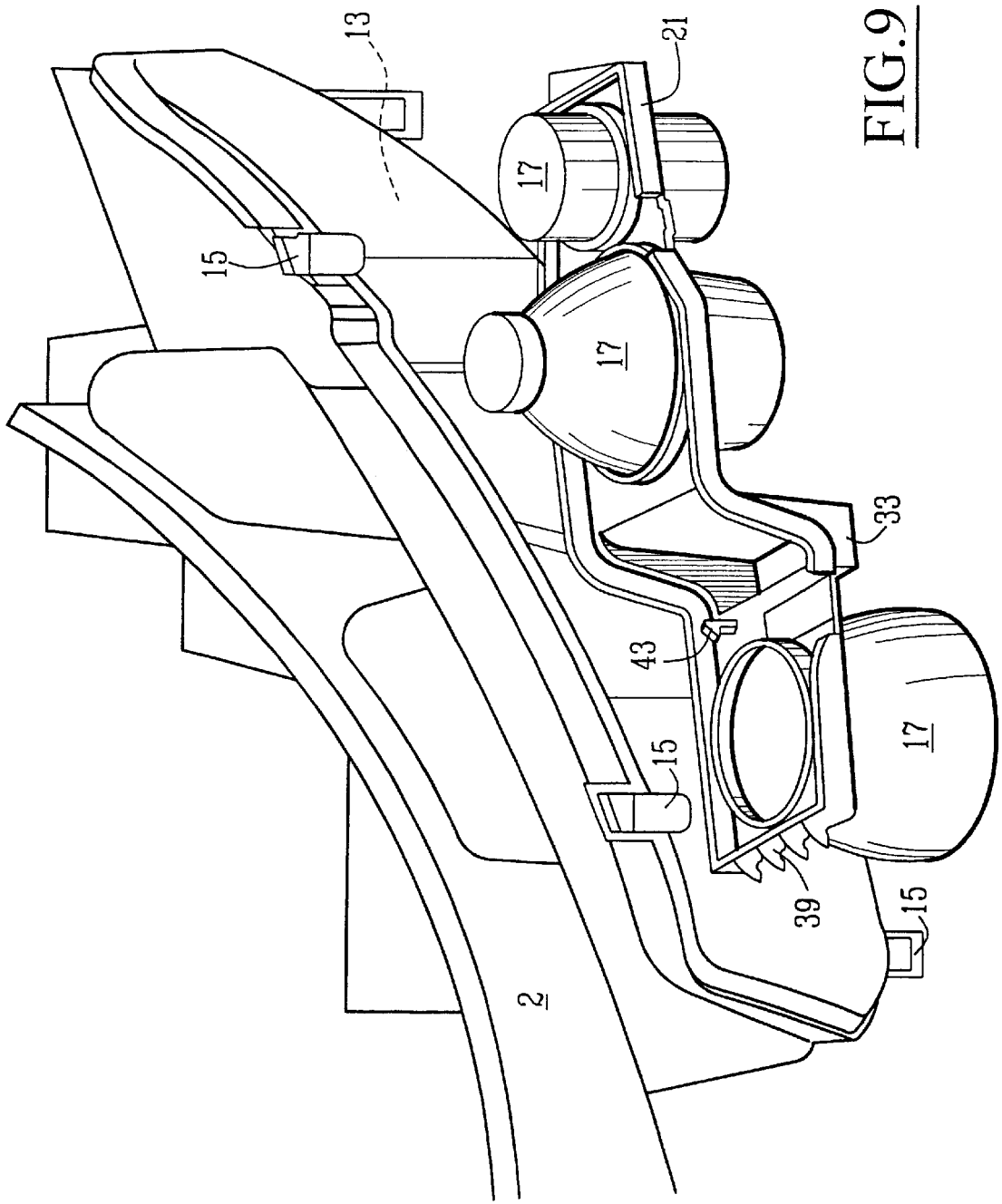
FIG. 9 is a top view of the optical unit represented in the previous figures, the fixing plate being in its pre-mounted position on the adjustable support.

The fixing plate 21 and the headlamp elements 17 appear then in the position represented in FIG. 9, a position in which the headlamp elements 17 are easily accessible by the user from the vehicle exterior, with full visibility.

As will be evident from the description which has just been given, the invention enables an optical unit to be realized, the maintenance of which, in particular the removal and replacement of headlamp elements, is greatly facilitated. The use of a positionally adjustable support, distinct from the fixing plate for the headlamp elements, also enables maintenance operations to be performed without altering the previously made settings.

What is claimed is:

1. In an optical unit for an automotive vehicle, comprising a housing (5) having a main opening (13) intended to be facing the vehicle exterior, at least one lamp element (17) fixed inside said housing (5), an intermediate fastening member (21) on which said lamp element (17) is detachably fixed, and a support (22) in the housing (5) to which the fastening member (21) is detachably secured; the improvement wherein said support is positionially adjustable relative to the housing (5), thereby to alter the optical setting of said lamp element (17), whereby said fastening member (21) and a said lamp element (17) can be detached from said support (22) and removed from said housing (5) without losing said optical setting.

2. Optical unit according to claim 1, characterized in that the intermediate fastening member (21) is a fixing plate in which at least one recess (31) is made, suitable for receiving in a complementary manner said at least one headlamp element (17).

3. Optical unit according to claim 1, characterized in that the intermediate fastening member (21) has at least one grip handle (33) projecting toward the main opening (13).

4. Optical unit according to claim 1, characterized in that said releasable fastening means (22, 67) comprise releasable locking means (43, 59, 67) ensuring the detachable fastening connection of the intermediate fastening member (21) on the adjustable support (22).

5. Optical unit according to claim 4, characterized in that the releasable locking means (22, 67) comprise at least one locking finger (67) mounted pivotably on the support (22) and comprising a locking pin (75) suitable for cooperating with a shoulder formed on the intermediate fastening member (21), and a form of rotary drive (69).

6. Optical unit according to claim 4, characterized in that the releasable locking means (22, 67) comprise at least one pair of complementary latching elements (43, 59) formed respectively on the intermediate fastening member (21) and on the support (22), suitable for retaining the intermediate fastening member (21) and the support (22) in a mutual pre-locked ready position.

7. Optical unit according to claim 1, characterized in that the adjustable support (22) has at least one guide (55) for the intermediate fastening member (21) between a locking position and a pre-mounting position on said support (22).

8. Optical unit according to claim 7, characterized in that the adjustable support (22) has a body (51) suitable for cooperating by complementarity of form with the intermediate fastening member (21), when these are in their locking position, and the guide (55) extends substantially in the direction of the main opening (13) from said body (51).

9. Optical unit according to claim 8, characterized in that the guide (55) has a free end edge (56) close to which a member (57) is formed for retaining the intermediate fastening member (21) in its pre-mounting position, said retaining member (57) being suitable for cooperating with a complementary member (35) formed on the intermediate fastening member (21).

10. Optical unit according to claim 9, characterized in that the retaining member (57) and the complementary member (35) define a pivot connection allowing pivoting of the intermediate fastening member (21) relative to the support (22), when the intermediate fastening member (21) reaches a position close to the free end edge (56) of the guide (55).

11. Optical unit according to claim 1, characterized in that it comprises a glass fixed detachably on the housing (5) such as to close off at least partially the main opening (13).

12. Optical unit according to claim 1, characterized in that the housing (5) is realized in one piece with a bodywork element or structural element of the vehicle.

13. Front face of the automotive vehicle comprising an optical unit according to claim 1.

14. Automotive vehicle comprising an optical unit according to claim 1.

* * * * *